United States Patent
Hashimoto et al.

(10) Patent No.: US 11,493,052 B2
(45) Date of Patent: Nov. 8, 2022

(54) BEARING AND TURBOCHARGER

(71) Applicant: IHI Corporation, Tokyo (JP)

(72) Inventors: Koji Hashimoto, Tokyo (JP); Kiyokazu Iizuka, Tokyo (JP); Eunseok Choi, Tokyo (JP); Michihiko Tanigaki, Tokyo (JP); Yutaka Uneura, Tokyo (JP)

(73) Assignee: IHI Corporation, Tokyo (JP)

( * ) Notice: Subject to any disclaimer, the term of this patent is extended or adjusted under 35 U.S.C. 154(b) by 102 days.

(21) Appl. No.: 17/036,023

(22) Filed: Sep. 29, 2020

(65) Prior Publication Data

US 2021/0010482 A1 Jan. 14, 2021

Related U.S. Application Data

(63) Continuation of application No. PCT/JP2019/015876, filed on Apr. 11, 2019.

(30) Foreign Application Priority Data

Apr. 27, 2018 (JP) .............................. JP2018-087506

(51) Int. Cl.
*F04D 29/056* (2006.01)
*F16C 17/02* (2006.01)
(Continued)

(52) U.S. Cl.
CPC ......... *F04D 29/056* (2013.01); *F04D 25/024* (2013.01); *F04D 29/063* (2013.01);
(Continued)

(58) Field of Classification Search
None
See application file for complete search history.

(56) References Cited

U.S. PATENT DOCUMENTS 8,708,567 B2 * 4/2014 Lee ..................... F16C 33/1065
384/293
9,222,511 B2 * 12/2015 Lee ....................... F16C 33/103
(Continued)

FOREIGN PATENT DOCUMENTS

CN 86106628 A 10/1987
CN 103953641 A 7/2014
(Continued)

OTHER PUBLICATIONS

Combined Chinese Office Action and Search Report dated Nov. 24, 2021 (received by client on Dec. 3, 2021) in corresponding Chinese Patent Application No. 201980025715.3 (with English Translation), 6 pages.
(Continued)

*Primary Examiner* — Juan G Flores
(74) *Attorney, Agent, or Firm* — Oblon, McClelland, Maier & Neustadt, L.L.P.

(57) ABSTRACT

A full-floating bearing includes: an outer peripheral groove having a groove width larger than a value of 0.69, which is a value obtained by subtracting a chamfer width as a width of a chamfered portions in a center axis direction and the groove width as a width of the groove in the center axis direction from a total width being a width of a main body in the center axis direction and dividing a net width by a total width.

8 Claims, 6 Drawing Sheets

(51) Int. Cl.
*F04D 29/063* (2006.01)
*F04D 25/02* (2006.01)
*F16C 17/26* (2006.01)

(52) U.S. Cl.
CPC .............. *F16C 17/02* (2013.01); *F16C 17/26* (2013.01); *F16C 2360/24* (2013.01)

(56) References Cited

U.S. PATENT DOCUMENTS

| | | |
|---|---|---|
| 2010/0316313 A1 | 12/2010 | Ishigo et al. |
| 2014/0119898 A1 | 5/2014 | Nishida |
| 2014/0219777 A1 | 8/2014 | Uneura et al. |
| 2017/0000981 A1 | 1/2017 | Futae et al. |
| 2017/0009810 A1* | 1/2017 | Futae ...................... F16C 17/18 |
| 2017/0356493 A1 | 12/2017 | Kruhoffer et al. |

FOREIGN PATENT DOCUMENTS

| | | | |
|---|---|---|---|
| CN | 105940229 A | | 9/2016 |
| CN | 106460648 A | | 2/2017 |
| CN | 107002751 A | | 8/2017 |
| CN | 206592434 U | | 10/2017 |
| DE | 20 2016 103 558 U1 | | 7/2016 |
| DE | 11 2017 003 999 T5 | | 4/2019 |
| DE | 112017003999 T5 | * | 4/2019 ........... F01D 25/162 |
| DE | 11 2018 001 791 T5 | | 12/2019 |
| JP | 47-46285 | | 11/1972 |
| JP | 56-143316 A | | 11/1981 |
| JP | 56143316 A | * | 11/1981 |
| JP | 62-163324 U | | 10/1987 |
| JP | 62163324 U | * | 10/1987 |
| JP | 9-236118 A | | 9/1997 |
| JP | 2000-145663 A | | 5/2000 |
| JP | 2002-213248 A | | 7/2002 |
| JP | 2002-332864 A | | 11/2002 |
| JP | 2009-7935 A | | 1/2009 |
| JP | 2010-116944 A | | 5/2010 |
| WO | WO 2015/128978 A1 | | 9/2015 |

OTHER PUBLICATIONS

Gao Zhenjun et al., "Structure Design and Numerical Simulation Study for Radial Journal Bearing with Wear Resistance", Journal of Harbin Bearing, vol. 36, No. 2, Jun. 30, 2015, pp. 47-51.
International Search Report dated Jun. 25, 2019 in PCT/JP2019/015876 filed Apr. 11, 2019 (with English translation), 4 pages.
Combined Chinese Office Action and Search Report dated Aug. 27, 2021 in Chinese Patent Application No. 201980025715.3 (with English translation of Categories of Cited Documents), 8 pages.
German Office Action dated Jun. 8, 2022 in German Patent Application No. 112019002201.6, 10 pages.

* cited by examiner

BEARING AND TURBOCHARGER

CROSS REFERENCE TO RELATED APPLICATIONS

This application is a continuation application of International Application No. PCT/JP2019/015876, filed on Apr. 11, 2019, which claims priority to Japanese Patent Application No. 2018-087506, filed on Apr. 27, 2018, the entire contents of which are incorporated by reference herein.

BACKGROUND ART

Technical Field

The present disclosure relates to a turbocharger.

Related Art

In Patent Literature 1, there is a disclosure as to a turbocharger including a turbine impeller, a compressor impeller, a shaft, and a pair of full-floating bearings. The turbine impeller is provided at one end of the shaft, and the compressor impeller is provided at another end of the shaft. The pair of full-floating bearings axially support the shaft so that the shaft is freely rotatable. The pair of full-floating bearings are arranged so as to be spaced apart from each other in an axial direction of the shaft. The full-floating bearing has a plurality of through holes extending in a radial direction. The full-floating bearing has a circumferential groove extending over an entire circumference of an outer peripheral surface.

CITATION LIST

Patent Literature

Patent Literature 1: WO 2015/128978 A1

SUMMARY

Technical Problem

It is known that the circumferential groove formed in the outer peripheral surface of the full-floating bearing suppresses a so-called whirl noise. However, when the circumferential groove is formed in the outer peripheral surface of the full-floating bearing, an area of the outer peripheral surface of the full-floating bearing is reduced. The full-floating bearing becomes more liable to wear when the area of the outer peripheral surface is reduced.

The present disclosure has an object to provide a bearing which is capable of reducing wear of a full-floating bearing, and a turbocharger.

Solution to Problem

In order to solve the above-mentioned problem, according to one mode of the present disclosure, there is provided a bearing, including: a main body having an annular shape; chamfered portions formed at both ends of an outer peripheral surface of the main body in a center axis direction; and an outer peripheral groove which is a groove extending in a circumferential direction of the outer peripheral surface of the main body, the outer peripheral groove having a groove width larger than a value of 0.69, which is a value obtained by subtracting a chamfer width as a width of the chamfered portions in the center axis direction and the groove width as a width of the groove in the center axis direction from a total width being a width of the main body in the center axis direction and dividing the net width by the total width.

In the outer peripheral groove, a value obtained by dividing a depth of the main body in a radial direction by the groove width may be equal to or larger than 0.083.

In the outer peripheral groove, a value obtained by dividing the net width by the total width may be equal to or smaller than 0.75.

An inner peripheral groove extending in a circumferential direction may be formed in an inner peripheral surface of the main body.

In order to solve the above-mentioned problem, according to one mode of the present disclosure, there is provided a turbocharger including the above-mentioned bearing.

Effects of Disclosure

According to the present disclosure, a bearing which is capable of reducing wear of a full-floating bearing, and a turbocharger can be achieved.

DESCRIPTION OF EMBODIMENTS

Figure 1:
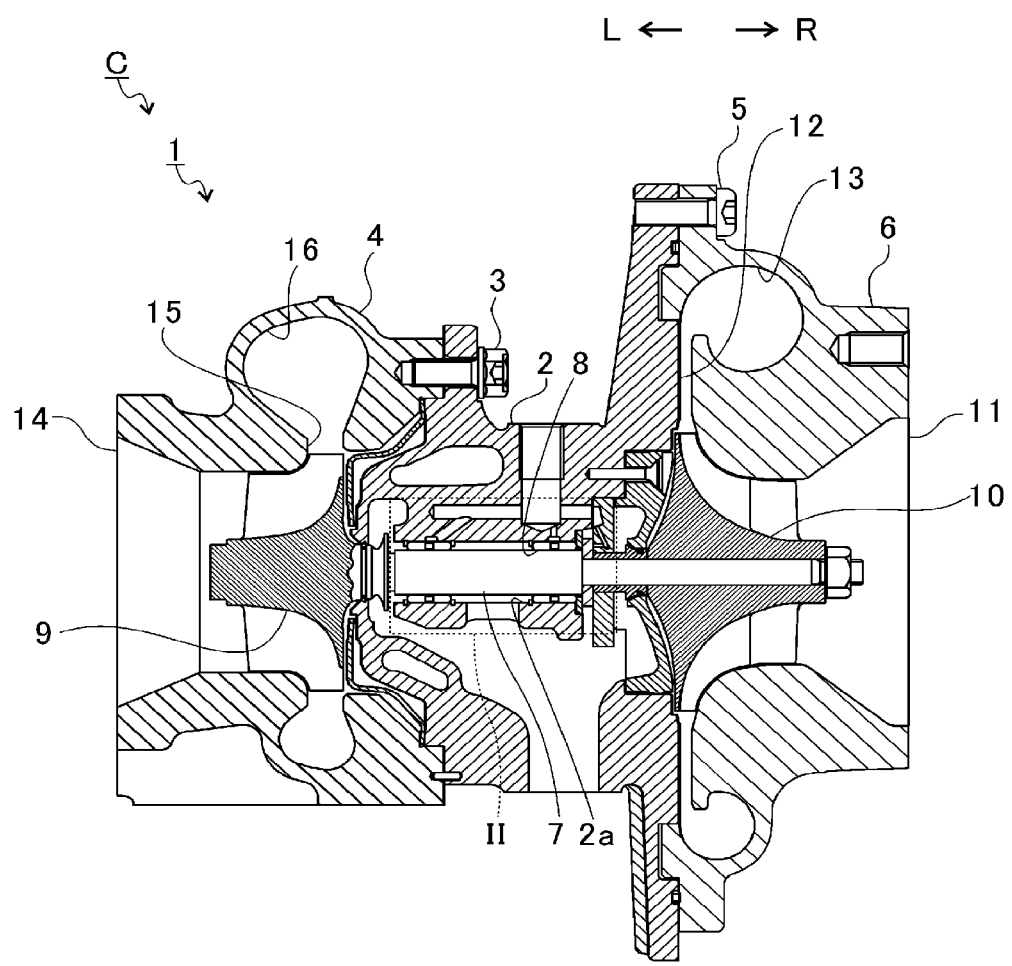
FIG. 1 is a schematic sectional view of a turbocharger.

Now, with reference to the attached drawings, one embodiment of the present disclosure is described. The dimensions, materials, and other specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Illustration of elements with no direct relationship to the present disclosure is omitted.

FIG. 1 is a schematic sectional view for illustrating a turbocharger C. In the following, a direction indicated by the arrow L illustrated in FIG. 1 corresponds to a left side of the turbocharger C. A direction indicated by the arrow R illustrated in FIG. 1 corresponds to a right side of the turbocharger C. As illustrated in FIG. 1, the turbocharger C includes a turbocharger main body 1. The turbocharger main body 1 is formed of a bearing housing (housing) 2, a turbine housing 4, and a compressor housing 6. The turbine housing 4 is coupled to a left side of the bearing housing 2 by a fastening bolt 3. The compressor housing 6 is coupled to a right side of the bearing housing 2 by a fastening bolt 5.

A bearing hole 2a is formed in the bearing housing 2. The bearing hole 2a passes through the bearing housing 2 in a right-and-left direction of the turbocharger C. The bearing hole 2a is configured to accommodate a part of the shaft 7. The pair of full-floating bearings 8 are accommodated in the bearing hole 2a. The shaft 7 is axially supported by the pair of full-floating bearings 8 so that the shaft 7 is rotatable. A turbine impeller 9 is provided at a left end portion of the shaft 7. The turbine impeller 9 is accommodated in the turbine housing 4 so as to be rotatable. A compressor impeller 10 is provided at a right end portion of the shaft 7. The compressor impeller 10 is accommodated in the compressor housing 6 so as to be rotatable.

An intake port 11 is formed in the compressor housing 6. The intake port 11 is opened on the right side of the turbocharger C. The intake port 11 is connected to an air cleaner (not shown). A diffuser flow passage 12 is defined by the opposed surfaces of the bearing housing 2 and the compressor housing 6. The diffuser flow passage 12 increases pressure of air. The diffuser flow passage 12 has an annular shape. The diffuser flow passage 12 communicates with the intake port 11 on a radially inner side through intermediation of the compressor impeller 10.

A compressor scroll flow passage 13 is formed in the compressor housing 6. The compressor scroll flow passage 13 has an annular shape. The compressor scroll flow passage 13 is located, for example, on an outer side with respect to the diffuser flow passage 12 in a radial direction of the shaft 7. The compressor scroll flow passage 13 communicates with an intake port of an engine (not shown) and the diffuser flow passage 12. When the compressor impeller 10 rotates, the air is sucked from the intake port 11 into the compressor housing 6. The sucked air is pressurized and accelerated in the course of flowing through blades of the compressor impeller 10. The air having been pressurized and accelerated is increased in pressure in the diffuser flow passage 12 and the compressor scroll flow passage 13. The air having been increased in pressure is led to the intake port of the engine.

A discharge port 14 is formed in the turbine housing 4. The discharge port 14 is opened on the left side of the turbocharger C. The discharge port 14 is connected to an exhaust gas purification device (not shown). A connection passage 15 and a turbine scroll flow passage 16 are formed in the turbine housing 4. The turbine scroll flow passage 16 has an annular shape. The turbine scroll flow passage 16 is located, for example, on an outer side with respect to the connection passage 15 in a radial direction of the turbine impeller 9. The turbine scroll flow passage 16 communicates with a gas inflow port (not shown). Exhaust gas discharged from an exhaust manifold (not shown) of the engine is led to the gas inflow port. The connection passage 15 connects the turbine scroll flow passage 16 and the discharge port 14 to each other. Thus, the exhaust gas having been led from the gas inflow port to the turbine scroll flow passage 16 is led to the discharge port 14 through the connection passage 15 and the turbine impeller 9. The exhaust gas led to the discharge port 14 rotates the turbine impeller 9 in the course of flowing.

A rotational force of the turbine impeller 9 is transmitted to the compressor impeller 10 through the shaft 7. When the compressor impeller 10 rotates, the pressure of the air is increased as described above. In such a manner, the air is led to the intake port of the engine.

Figure 2:
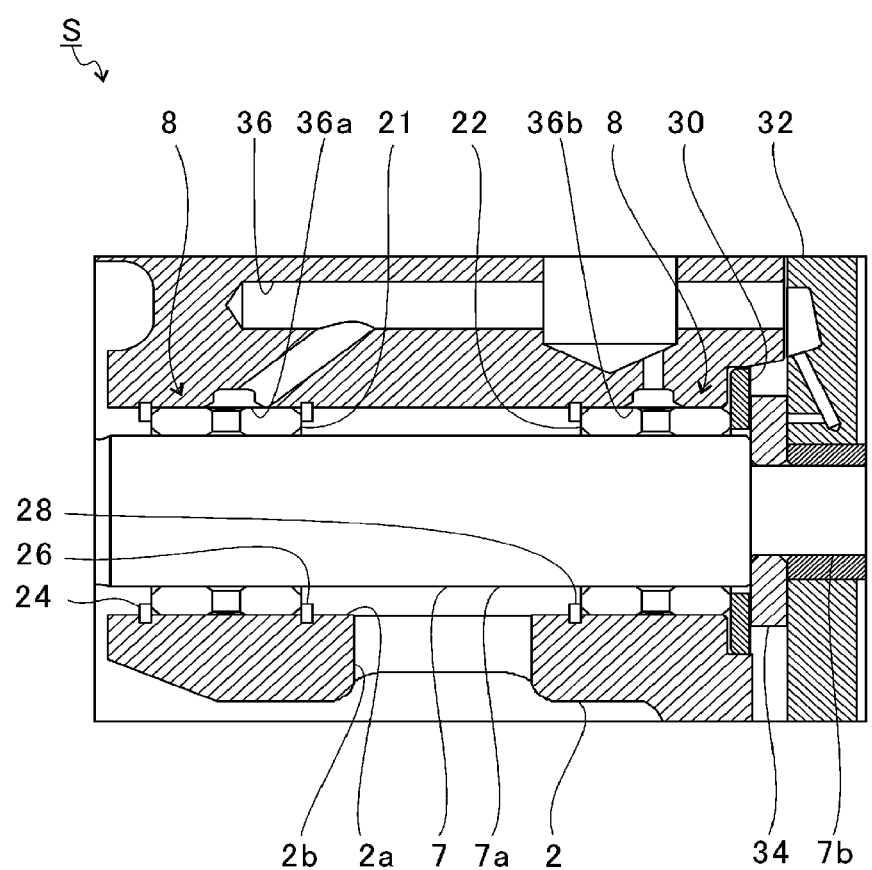
FIG. 2 is an extracted view for illustrating the broken-line portion of FIG. 1.

FIG. 2 is an extracted view for illustrating the broken-line portion of FIG. 1. The turbocharger C has, as illustrated in FIG. 2, a bearing structure S. The bearing structure S includes a bearing hole 2a, the shaft 7, and the pair of full-floating bearings 8. The pair of full-floating bearings 8 are spaced apart from each other in the axial direction of the shaft 7 (hereinafter referred to simply as "axial direction").

In the following, when the pair of full-floating bearings 8 are to be distinguished, the full-floating bearing 8 on the left side in FIG. 2 (turbine impeller 9 side) is referred to as "turbine-side bearing 21". The full-floating bearing 8 on the right side in FIG. 2 (compressor impeller 10 side) is referred to as "compressor-side bearing 22".

The turbine-side bearing 21 and the compressor-side bearing 22 each have a characteristic configuration of this embodiment, and hence are described later in detail.

A first ring 24, a second ring 26, a third ring 28, and thrust bearings 30 and 32 are provided to the bearing housing 2. The first ring 24 is arranged on the left side in FIG. 2 (turbine impeller 9 side) with respect to the turbine-side bearing 21 in the bearing hole 2a. The bearing hole 2a has an annular inner peripheral groove formed on the left side in FIG. 2 (turbine impeller 9 side) with respect to the turbine-side bearing 21. The first ring 24 is fitted to the inner peripheral groove formed on the turbine impeller 9 side with respect to the turbine-side bearing 21 in the bearing hole 2a.

The second ring 26 is arranged on the right side in FIG. 2 (compressor impeller 10 side) with respect to the turbine-side bearing 21 in the bearing hole 2a. The bearing hole 2a has an annular inner peripheral groove formed on the right side in FIG. 2 (compressor impeller 10 side) with respect to the turbine-side bearing 21. The second ring 26 is fitted to the inner peripheral groove formed on the compressor impeller 10 side with respect to the turbine-side bearing 21 in the bearing hole 2a.

The turbine-side bearing 21 is arranged between the first ring 24 and the second ring 26 in the axial direction of the shaft 7. The movement of the turbine-side bearing 21 in the axial direction of the shaft 7 is regulated by the first ring 24 and the second ring 26.

The third ring 28 is arranged on the left side in FIG. 2 (turbine impeller 9 side) with respect to the compressor-side bearing 22 in the bearing hole 2a. The bearing hole 2a has an annular inner peripheral groove formed on the left side in FIG. 2 (turbine impeller 9 side) with respect to the compressor-side bearing 22. The third ring 28 is fitted to the inner peripheral groove formed on the turbine impeller 9 side with respect to the compressor-side bearing 22 in the bearing hole 2a. The third ring 28 is arranged on the right side in FIG. 2 (compressor impeller 10 side) with respect to the second ring 26. The thrust bearings 30 and 32 are arranged on the right side in FIG. 2 (compressor impeller 10 side) with respect to the compressor-side bearing 22.

The compressor-side bearing 22 is arranged between the third ring 28 and the thrust bearing 30 in the axial direction of the shaft 7. The movement of the compressor-side bearing 22 in the axial direction of the shaft 7 is regulated by the third ring 28 and the thrust bearing 30.

The shaft 7 includes a large-diameter portion 7a and a small-diameter portion 7b. An outer diameter of the large-diameter portion 7a is larger than an outer diameter of the small-diameter portion 7b. A step portion defined by a difference in outer diameter between the large-diameter portion 7a and the small-diameter portion 7b is formed between the large-diameter portion 7a and the small-diameter portion 7b. A thrust collar 34 is mounted to the small-diameter portion 7b in the vicinity of the step portion.

The large-diameter portion 7a is inserted through the turbine-side bearing 21, the compressor-side bearing 22, and the thrust bearing 30. The small-diameter portion 7b is inserted through the thrust bearing 32 and the thrust collar 34.

The thrust bearing 30 is arranged on the turbine impeller 9 side of the thrust collar 34. The thrust bearing 30 receives, through the thrust collar 34, a load applied when the shaft 7 moves toward the turbine impeller 9 side. The thrust bearing 32 is arranged on the compressor impeller 10 side of the thrust collar 34. The thrust bearing 32 receives, through the thrust collar 34, a load applied when the shaft 7 moves toward the compressor impeller 10 side.

An oil passage 36 is formed in the bearing housing 2. Lubricating oil having been pumped out from a pump (not shown) is introduced into the oil passage 36. The oil passage 36 has two openings 36a and 36b each communicating with an inside of the bearing hole 2a. The openings 36a and 36b are arranged apart from each other in the axial direction of the shaft 7.

The opening 36a is opposed to the turbine-side bearing 21 in the radial direction of the shaft 7. The opening 36b is opposed to the compressor-side bearing 22 in the radial direction of the shaft 7. The lubricating oil having been introduced into the oil passage 36 flows into the bearing hole 2a through the openings 36a and 36b. The lubricating oil is supplied to the turbine-side bearing 21 through the opening 36a. The lubricating oil is supplied to the compressor-side bearing 22 through the opening 36b. The lubricating oil lubricates the turbine-side bearing 21 and the compressor-side bearing 22.

The lubricating oil flows through a space defined between an outer peripheral surface of each of the pair of full-floating bearings 8 and the bearing hole 2a. An oil film is formed between the outer peripheral surface of each of the pair of full-floating bearings 8 and the bearing hole 2a. The pair of full-floating bearings 8 is supported by oil-film pressure generated between each of the outer peripheral surfaces and the bearing hole 2a so that the pair of full-floating bearings 8 is freely rotatable.

The lubricating oil flows through a space defined between an inner peripheral surface of each of the pair of full-floating bearings 8 and the shaft 7. An oil film is formed between the inner peripheral surface of each of the pair of full-floating bearings 8 and the shaft 7. The pair of full-floating bearings 8 axially support the shaft 7 by oil-film pressure between each of the inner peripheral surfaces and the shaft 7 so that the shaft 7 is freely rotatable.

The pair of full-floating bearings 8 rotate at a speed lower than that of the rotation of the shaft 7 by a flow of the lubricating oil along with the rotation of the shaft 7. The pair of full-floating bearings 8 are rotatable relative to the bearing hole 2a in a non-contact state.

The bearing housing 2 has a vertical hole 2b. The vertical hole 2b communicates with the bearing hole 2a and extends vertically downward. A part of the lubricating oil having flowed into the bearing hole 2a is discharged vertically downward through the vertical hole 2b.

A part of the lubricating oil having flowed into the bearing hole 2a is discharged from both end sides of the bearing hole 2a in the axial direction of the shaft 7. A part of the lubricating oil having been discharged from the compressor impeller 10 side of the bearing hole 2a is supplied to the thrust bearings 30 and 32. A part of the lubricating oil having been supplied to the thrust bearings 30 and 32 is discharged vertically downward after lubricating the thrust bearings 30 and 32.

Figure 3A:
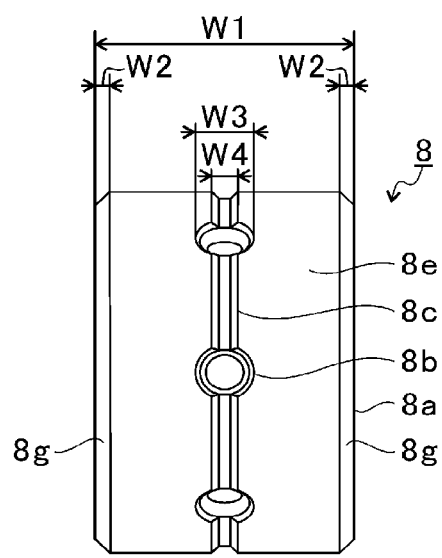
FIG. 3A is a front view of a full-floating bearing of this embodiment.
Figure 3B:
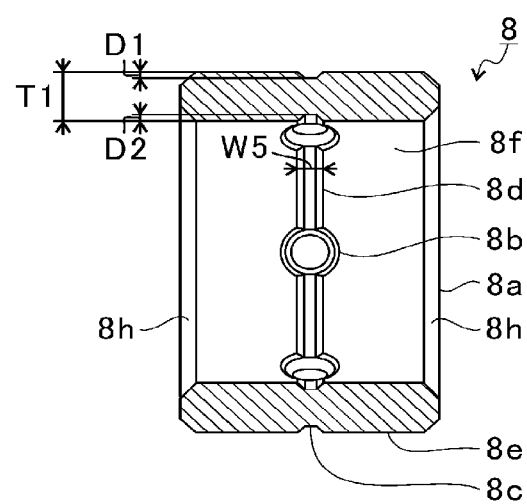
FIG. 3B is a sectional view of the full-floating bearing of this embodiment including a rotation axis.

FIG. 3A is a front view of the full-floating bearing 8 of this embodiment. FIG. 3B is a sectional view of the full-floating bearing 8 of this embodiment including a rotation axis. Here, the turbine-side bearing 21 is described in detail. A configuration of the compressor-side bearing 22 is substantially the same as that of the turbine-side bearing 21, and hence a description thereof is omitted.

The full-floating bearing 8 includes a main body 8a having an annular shape. The main body 8a has through holes 8b, an outer peripheral groove 8c, and an inner peripheral groove 8d. The through holes 8b pass through the main body 8a in the radial direction. For example, six through holes 8b are formed at equal intervals in a circumferential direction of the main body 8a. The through holes 8b guide a part of the lubricating oil on an outer peripheral surface 8e side of the main body 8a toward an inner peripheral surface 8f side. However, the through holes 8b may be formed at unequal intervals in the circumferential direction of the main body 8a. Moreover, it is not always required that the main body 8a have a plurality of through holes 8b. For example, the main body 8a may have only a single (one) through hole 8b. The through holes 8b are formed at a center position (central position) in a center axis direction (width direction) of the main body 8a. However, the through holes 8b may be formed at a position spaced apart (located apart) from the center position in the center axis direction of the main body 8a. Moreover, when a plurality of through holes 8b are formed in the main body 8a, the through holes 8b are formed at the same position in the center axis direction of the main body 8a. However, when a plurality of through holes 8b are formed in the main body 8a, the through holes 8b may be formed at positions different from each other in the center axis direction of the main body 8a.

The outer peripheral groove 8c is a circumferential groove extending in the circumferential direction of the main body 8a. The outer peripheral groove 8c communicates with the six through holes 8b in the circumferential direction of the main body 8a. The outer peripheral groove 8c passes through center axes of the six through holes 8b. However, it is not always required that the outer peripheral groove 8c communicate with the six through holes 8b. That is, the outer peripheral groove 8c may be formed at a position different from the through holes 8b in the center axis direction of the main body 8a.

The inner peripheral groove 8d is a circumferential groove extending in the circumferential direction of the main body 8a. The inner peripheral groove 8d communicates with the six through holes 8b in the circumferential direction of the main body 8a. The inner peripheral groove 8d passes through center axes of the six through holes 8b. However, it is not always required that the inner peripheral groove 8d communicate with the six through holes 8b. That is, the inner peripheral groove 8d may be formed at a position different from the through holes 8b in the center axis direction of the main body 8a.

The main body 8a has a pair of chamfered portions 8g formed on the outer peripheral surface 8e. The main body 8a has a pair of chamfered portions 8h formed on the inner peripheral surface 8f. The pairs of chamfered portions 8g and 8h are formed at both ends in the center axis direction of the main body 8a. The chamfered portions 8g are each changed in outer diameter in the center axis direction of the main body 8a. The chamfered portions 8h are each changed in inner diameter in the center axis direction of the main body 8a. The chamfered portions 8g are each gradually reduced in outer diameter in a direction of separating away from the center position in the center axis direction of the main body 8a. The chamfered portions 8h are each gradually reduced in inner diameter in the direction of separating away from the center position in the center axis direction of the main body 8a. Thus, a thickness of the main body 8a is reduced at the chamfered portions 8g and 8h toward the direction of separating away from the center position in the center axis direction of the main body 8a.

As illustrated in FIG. 3A, the main body 8a has a certain width (total width) W1 in the center axis direction. The chamfered portions 8g each have a certain width W2 in the center axis direction of the main body 8a. The pair of chamfered portions 8g are formed at both ends in the center axis direction of the main body 8a. Therefore, a total width (chamfer width) of the pair of chamfered portions 8g is twice the width W2. The through holes 8b each have a width W3 which is maximum in the center axis direction of the main body 8a. The width W3 is approximately equal to a diameter of the through hole 8b. The outer peripheral groove 8c has a width (outer peripheral groove width) W4 which is maximum in the center axis direction of the main body 8a.

The width W4 of the outer peripheral groove 8c is larger than the width W2 of the chamfered portion 8g. The width W4 of the outer peripheral groove 8c is, for example, 0.85 mm. The width W2 of the chamfered portion 8g is, for example, 0.3 mm. The width W3 of the through hole 8b is larger than the width W4 of the outer peripheral groove 8c. The width W3 of the through hole 8b is, for example, 1.5 mm. The width W1 of the main body 8a is larger than the width W3 of the through hole 8b. The width W1 of the main body 8a is, for example, 5.8 mm.

As illustrated in FIG. 3B, the main body 8a has a certain thickness T1 in the radial direction. The outer peripheral groove 8c has a depth (outer peripheral groove depth) D1 which is maximum in the radial direction of the main body 8a. Meanwhile, the inner peripheral groove 8d has a width (inner peripheral groove width) W5 which is maximum in the center axis direction of the main body 8a. The inner peripheral groove 8d has a depth (inner peripheral groove depth) D2 which is maximum in the radial direction of the main body 8a.

In this embodiment, the width W5 of the inner peripheral groove 8d is the same as the width W4 of the outer peripheral groove 8c. However, the width W5 of the inner peripheral groove 8d may be different from the width W4 of the outer peripheral groove 8c. For example, the width W5 of the inner peripheral groove 8d may be smaller than the width W4 of the outer peripheral groove 8c. Moreover, the width W5 of the inner peripheral groove 8d may be larger than the width W4 of the outer peripheral groove 8c.

In this embodiment, the depth D2 of the inner peripheral groove 8d is the same as the depth D1 of the outer peripheral groove 8c. However, the depth D2 of the inner peripheral groove 8d may be different from the depth D1 of the outer peripheral groove 8c. For example, the depth D2 of the inner peripheral groove 8d may be smaller than the depth D1 of the outer peripheral groove 8c. Moreover, the depth D2 of the inner peripheral groove 8d may be larger than the depth D1 of the outer peripheral groove 8c.

In this embodiment, the thickness T1 of the main body 8a is, for example, 1.8 mm. The width W4 of the outer peripheral groove 8c and the width W5 of the inner peripheral groove 8d are, for example, 0.85 mm. The depth D1 of the outer peripheral groove 8c and the depth D2 of the inner peripheral groove 8d are, for example, 0.2 mm.

Incidentally, in the turbocharger C, when a bearing of a full-floating type is adopted, occurrence of a noise called "whirl noise" may be pointed out in some cases. It is conceivable that the occurrence of the whirl noise is caused by self-excited vibration (whirl vibration) of the full-floating bearing 8 generated by pressure of an oil film formed inside and outside the bearing.

Here, a natural frequency of the full-floating bearing 8 changes, for example, when the outer peripheral groove 8c is formed in the outer peripheral surface 8e as illustrated in FIG. 3A. For example, as the width W4 of the outer peripheral groove 8c increases, the natural frequency of the full-floating bearing 8 increases. When the natural frequency of the full-floating bearing 8 changes, for example, resonance generated between the vibration of the bearing structure S and members arranged around the bearing structure S can be avoided. Thus, the whirl noise can be reduced when the outer peripheral groove 8c is formed in the outer peripheral surface 8e of the full-floating bearing 8.

However, when the outer peripheral groove 8c is formed in the outer peripheral surface 8e of the full-floating bearing 8, an area of the outer peripheral surface 8e of the full-floating bearing 8 is reduced. The full-floating bearing 8 becomes more liable to wear when the area of the outer peripheral surface 8e is reduced.

Figure 4:
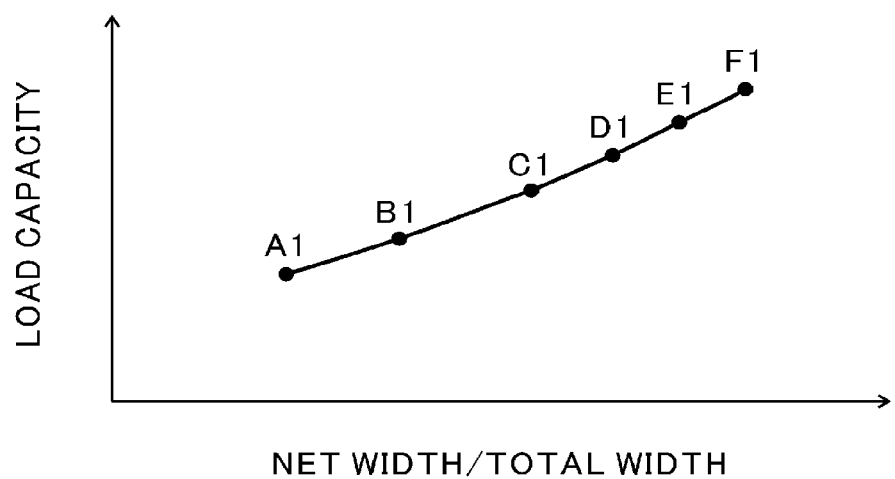
FIG. 4 is a graph for showing a relationship between a value obtained by dividing a net width of the full-floating bearing by a total width and a load capacity of the full-floating bearing.

Therefore, in this embodiment, the width W4 of the outer peripheral groove 8c is set within a predetermined range. FIG. 4 is a graph for showing a relationship between a value obtained by dividing a net width of the full-floating bearing 8 by a total width and a load capacity of the full-floating bearing 8. Here, the net width is a value obtained by subtracting a sum total width (chamfer width) of the pair of chamfered portions 8g in the axial direction and the width (outer peripheral groove width) W4 of the outer peripheral groove 8c in the axial direction from the width (total width) W1 of the main body 8a in the center axis direction.

A point A1 shown in FIG. 4 is a point at which the value obtained by dividing the net width by the total width is 0.690. A point B1 is a point at which the value obtained by dividing the net width by the total width is 0.750. A point C1 is a point at which the value obtained by dividing the net width by the total width is 0.819. A point D1 is a point at which the value obtained by dividing the net width by the total width is 0.862. A point E1 is a point at which the value obtained by dividing the net width by the total width is 0.897. A point F1 is a point at which the value obtained by dividing the net width by the total width is 0.931.

As shown in FIG. 4, as the value obtained by dividing the net width by the total width increases, the load capacity of the full-floating bearing 8 increases. That is, the wear of the full-floating bearing 8 is reduced as the value obtained by dividing the net width by the total width increases.

The point A1 shown in FIG. 4 is a value obtained by dividing the net width by the total width, which is given when the width W4 of the outer peripheral groove 8c described with reference to FIG. 3A is set to be larger (for example, the width W4 is changed from 0.85 mm to 1.2 mm). At the point A1, the natural frequency of the full-floating bearing 8 can be set to be larger by setting the width W4 of the outer peripheral groove 8c to be larger. As a result, the whirl noise can be reduced as compared to the case in which the width of the outer peripheral groove 8c is set to the width W4 described with reference to FIG. 3A. However, the area of the outer peripheral surface 8e is reduced when the width W4 of the outer peripheral groove 8c is set to be larger. Therefore, the outer peripheral surface 8e of the full-floating bearing 8 becomes more liable to wear. Here, as a result of an evaluation test for the full-floating bearing 8 having the point A1 as the value obtained by dividing the net width by the total width, the wear amount of the full-floating bearing 8 exceeded a reference value.

The area of the outer peripheral surface 8e can be increased by setting the net width to be larger. The wear amount of the full-floating bearing 8 can be reduced when the area of the outer peripheral surface 8e can be increased. Thus, in this embodiment, the value obtained by dividing the net width by the total width is set to a value larger than the point A1. Specifically, the value obtained by dividing the net width by the total width is set to a value larger than 0.69. The wear amount of the full-floating bearing 8 can be suppressed to a wear amount less than the reference value by setting the value obtained by dividing the net width by the total width to a value larger than 0.69.

Meanwhile, the reduction effect for the whirl noise becomes smaller as the net width is set to be larger (that is, the width W4 of the outer peripheral groove 8c is set to be smaller). Thus, it is preferred that the value obtained by dividing the net width by the total width be set to a value equal to or smaller than the point B1 shown in FIG. 4 (that is, equal to or smaller than 0.75).

In the full-floating bearing 8 of this embodiment, the value obtained by dividing the net width by the total width is set to a value larger than 0.69 and equal to or smaller than 0.75. With this, the full-floating bearing 8 of this embodiment is capable of achieving both the reduction of the whirl noise and the reduction of the wear amount of the full-floating bearing 8.

Figure 5:
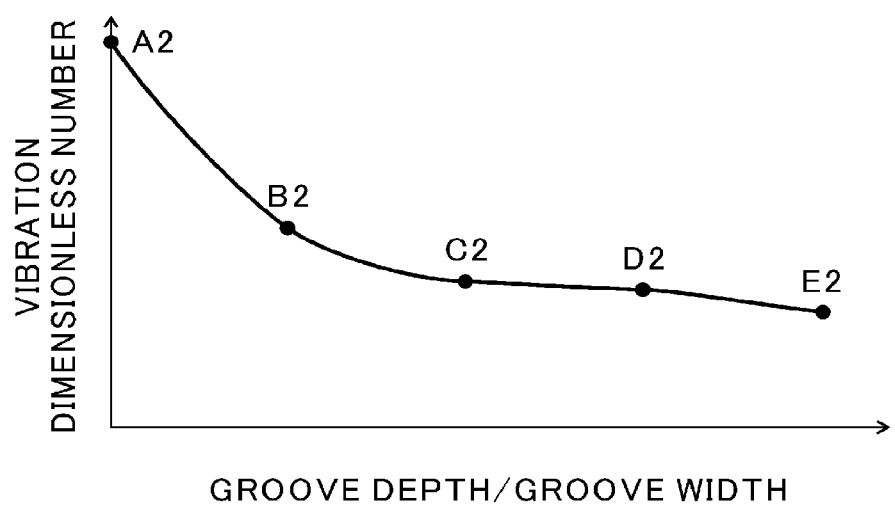
FIG. 5 is a graph for showing a relationship between a value obtained by dividing a depth of an outer peripheral groove by a vibration dimensionless number.

FIG. 5 is a graph for showing a relationship between a value obtained by dividing the depth D1 of the outer peripheral groove 8c by the width W4 of the outer peripheral groove 8c and a vibration dimensionless number. A point A2 shown in FIG. 5 is a point at which the value obtained by dividing the depth D1 by the width W4 is 0 (that is, a state in which the outer peripheral groove 8c is not formed in the outer peripheral surface 8e). A point B2 is a point at which the value obtained by dividing the depth D1 by the width W4 is 0.083. A point C2 is a point at which the value obtained by dividing the depth D1 by the width W4 is 0.167. A point D2 is a point at which the value obtained by dividing the depth D1 by the width W4 is 0.250. A point E2 is a point at which the value obtained by dividing the depth D1 by the width W4 is 0.333.

As shown in FIG. 5, the vibration dimensionless number becomes smaller as the value obtained by dividing the depth D1 by the width W4 is set to be larger. That is, an amplitude of the whirl vibration can be set to be smaller by setting the value obtained by dividing the depth D1 by the width W4 to be larger. The whirl noise can be reduced as the whirl vibration is set to be smaller.

At the point A2 shown in FIG. 5, for example, the depth D1 of the outer peripheral groove 8c is 0 mm. That is, the outer peripheral groove 8c is not formed in the outer peripheral surface 8e of the full-floating bearing 8. When the outer peripheral groove 8c is not formed, it is difficult to reduce the whirl noise.

The value obtained by dividing the depth D1 by the width W4 can be set to be larger, for example, by setting the depth D1 of the outer peripheral groove 8c to be larger. The whirl noise can be reduced when the value obtained by dividing the depth D1 by the width W4 can be set to be larger.

In this embodiment, the value obtained by dividing the depth D1 by the width W4 is set to a value equal to or larger than the point B2. Specifically, the value obtained by dividing the depth D1 by the width W4 is set to a value equal to or larger than 0.083. When the value obtained by dividing the depth D1 by the width W4 is set to be equal to or larger than 0.083, the amplitude of the whirl vibration can be set to an approximately half as compared to the case in which the outer peripheral groove 8c is not formed. With this, the whirl noise can be suppressed to be less than the reference value.

As mentioned above, in the full-floating bearing 8 of this embodiment, the value obtained by dividing the net width by the total width is set to a value larger than 0.69 and equal to or smaller than 0.75. Moreover, in the full-floating bearing 8 of this embodiment, the value obtained by dividing the depth D1 by the width W4 is set to a value equal to or larger than 0.083. With this, the full-floating bearing 8 of this embodiment is capable of effectively reducing the whirl noise.

However, as the depth D1 of the outer peripheral groove 8c is set to be larger (that is, as the value obtained by dividing the depth D1 by the width W4 is set to be larger), the lubricating oil on the outer peripheral surface 8e side of the full-floating bearing 8 becomes more liable to leak from the outer peripheral surface 8e side to the inner peripheral surface 8f side. When the lubricating oil becomes more liable to leak from the outer peripheral surface 8e side to the inner peripheral surface 8f side, the thickness of the oil film formed between the outer peripheral surface 8e and the bearing hole 2a becomes smaller. When the thickness of the oil film becomes smaller, the outer peripheral surface 8e of the full-floating bearing 8 becomes more liable to wear. Thus, it is preferred that the value obtained by dividing the depth D1 by the width W4 be set to a value equal to or smaller than the point E2 shown in FIG. 5 (that is, equal to or smaller than 0.333).

According to this embodiment, in the full-floating bearing 8, the width W4 and the depth D1 of the outer peripheral groove 8c are each set so as to fall within a predetermined range. With this, in the full-floating bearing 8, the whirl noise and the wear amount of the full-floating bearing can be reduced.

Moreover, in this embodiment, the inner peripheral groove 8d extending in the circumferential direction is formed in the inner peripheral surface 8f of the main body 8a. Similarly to the case in which the outer peripheral groove 8c is formed in the outer peripheral surface 8e, the whirl noise can be reduced also in the case in which the inner peripheral groove 8d is formed in the inner peripheral surface 8f. Thus, in the full-floating bearing 8, as compared to the case in which the inner peripheral groove 8d is not formed in the inner peripheral surface 8f, the whirl noise can be effectively reduced in the case in which the inner peripheral groove 8d is formed in the inner peripheral surface 8f.

The embodiment has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

In the embodiment described above, a description has been made of the example in which the through holes 8b are formed in the main body 8a of the full-floating bearing 8. However, the through holes 8b are dispensable. Thus, it is not always required that the through holes 8b be formed in the main body 8a. When the through holes 8b are not formed in the main body 8a, the lubricating oil passes on the side surface of the main body 8a from the outer peripheral surface 8e of the main body 8a and flows into a space between the shaft 7 and the inner peripheral surface 8f.

In the embodiment described above, a description has been made of the example in which the inner peripheral groove 8d is formed in the inner peripheral surface 8f of the full-floating bearing 8. However, the inner peripheral groove 8d is dispensable. Thus, it is not always required that the inner peripheral groove 8d be formed in the inner peripheral surface 8f of the full-floating bearing 8.

In the embodiment described above, a description has been made of the example in which one outer peripheral groove 8c is formed in the outer peripheral surface 8e of the full-floating bearing 8. However, the present disclosure is not limited to such a configuration, and a plurality of outer peripheral grooves 8c may be formed in the outer peripheral surface 8e of the full-floating bearing 8. In such a case, the width W4 of the outer peripheral groove 8c corresponds to a sum total width of the plurality of outer peripheral grooves 8c.

In the embodiment described above, a description has been made of the example in which one inner peripheral groove 8d is formed in the inner peripheral surface 8f of the full-floating bearing 8. However, the present disclosure is not limited to such a configuration, and a plurality of inner peripheral grooves 8d may be formed in the inner peripheral surface 8f of the full-floating bearing 8. In such a case, the width W5 of the inner peripheral groove 8d corresponds to a sum total width of the plurality of inner peripheral grooves 8d.

In the embodiment described above, a description has been made of the example in which the net width is adjusted through adjustment of the width W4. However, the present disclosure is not limited to such a configuration, and the net width may be adjusted based on the width W2 of the chamfered portion 8g. For example, although the width W2 of the chamfered portion 8g is set to 0.3 mm in the embodiment described above, the width W2 may be set to be smaller, for example, may be set to 0.1 mm. The net width can be set to be larger by changing the width W2 from 0.3 mm to 0.1 mm. The width W2 of the chamfered portion 8g can suitably be changed within the range of from 0.1 mm to 0.3 mm. The width W2 of the chamfered portion 8g may be different on the turbine impeller 9 side and on the compressor impeller 10 side. Moreover, the net width may be adjusted based on a combination of the width W4 of the outer peripheral groove 8c and the width W2 of the chamfered portion 8g.

INDUSTRIAL APPLICABILITY

The present disclosure can be used for a bearing and a turbocharger.

What is claimed is:

1. A bearing, comprising:
   a main body having an annular shape;
   chamfered portions formed at both ends of an outer peripheral surface of the main body in a center axis direction; and
   an outer peripheral groove extending in a circumferential direction on the outer peripheral surface of the main body, a value obtained by dividing a net width of the outer peripheral surface in the center axis direction by a total width of the main body in the center axis direction being larger than 0.69, the net width being obtained by subtracting a width of the chamfered portions in the center axis direction and a width of the groove in the center axis direction from the total width,
   wherein a value obtained by dividing a depth of the groove in a radial direction by the width of the groove is equal to or larger than 0.083.

2. The bearing according to claim 1, wherein the value obtained by dividing the net width by the total width is equal to or smaller than 0.75.

3. The bearing according to claim 2, wherein an inner peripheral groove extending in the circumferential direction is formed in an inner peripheral surface of the main body.

4. The bearing according to claim 1, wherein an inner peripheral groove extending in the circumferential direction is formed in an inner peripheral surface of the main body.

5. A turbocharger comprising the bearing of claim 1.

6. A turbocharger comprising the bearing of claim 2.

7. A turbocharger comprising the bearing of claim 4.

8. A turbocharger comprising the bearing of claim 3.

* * * * *